US009050655B2

(12) United States Patent  
Chou et al.

(10) Patent No.: US 9,050,655 B2  
(45) Date of Patent: Jun. 9, 2015

(54) CONTINUOUS REACTOR AND METHOD FOR MANUFACTURING NANOPARTICLES

(71) Applicant: National Tsing Hua University, Hsinchu (TW)

(72) Inventors: Kan-Sen Chou, Hsinchu (TW); Yu-Chun Chang, Hsinchu (TW); Yi-Chu Chen, Hsinchu (TW); Yu-Chieh Lu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 13/683,972

(22) Filed: Nov. 21, 2012

(65) Prior Publication Data

US 2014/0047950 A1    Feb. 20, 2014

(30) Foreign Application Priority Data

Aug. 20, 2012  (TW) .............................. 101130098 A

(51) Int. Cl.
| | |
|---|---|
| B22F 9/16 | (2006.01) |
| B22F 1/00 | (2006.01) |
| B22F 9/24 | (2006.01) |
| B82Y 30/00 | (2011.01) |
| C30B 7/00 | (2006.01) |
| B01J 10/00 | (2006.01) |
| B82Y 99/00 | (2011.01) |
| B82Y 40/00 | (2011.01) |

(52) U.S. Cl.
CPC . B22F 9/16 (2013.01); B82Y 99/00 (2013.01); B22F 1/0018 (2013.01); B22F 1/0022 (2013.01); B22F 9/24 (2013.01); B82Y 40/00 (2013.01); B82Y 30/00 (2013.01)

(58) Field of Classification Search
USPC ................ 75/351; 117/68; 422/129; 977/896
See application file for complete search history.

(56) References Cited

U.S. PATENT DOCUMENTS

2005/0129580 A1*  6/2005  Swinehart et al. ............ 422/100

FOREIGN PATENT DOCUMENTS

| CN | 101765762 A | 6/2010 |
|---|---|---|
| CN | 102378626 A | 3/2012 |
| TW | 200739075 A | 10/2007 |
| TW | 200936496 A | 9/2009 |

* cited by examiner

*Primary Examiner* — Kaj K Olsen  
*Assistant Examiner* — Alexander Polyansky  
(74) *Attorney, Agent, or Firm* — Muncy, Geissler, Olds & Lowe, P.C.

(57) ABSTRACT

The present invention relates to a continuous reactor a method for manufacturing nanoparticles. The reactor of the present invention includes: a plurality of first inputs for individually inputting a plurality of reagents; a first mixing part connected to the first inputs to mix the reagents; N number of first reaction units, each comprising a plurality of first diverging channels and a first converging channel to form a channel having the first diverging channels and the first converging channels alternately connected to one another in series for N times of diverging-converging actions, wherein N≥1, and the first diverging channels of a $1^{st}$ one of the first reaction units are connected to the first mixing part; and a first output connected to the first converging channel of an $N^{th}$ one of the first reaction units, so as to output a product of nanoparticles.

9 Claims, 14 Drawing Sheets

CONTINUOUS REACTOR AND METHOD FOR MANUFACTURING NANOPARTICLES

BACKGROUND OF THE INVENTION

1. Field of the Invention

The present invention relates to a continuous reactor and a method for manufacturing nanoparticles using the same, and particularly to a method for continuously manufacturing nanoparticles through alternating diverging and converging channels.

2. Description of Related Art

Recently, much progress has been made in synthesis and applications of nanoparticles. In the past, nanoparticles are manufactured in a batch system which performs precipitation and reduction of many raw materials in a control volume to obtain the product, and therefore it needs to increase the reaction volume to increase production efficiency. However, the quality of synthesized nanoparticles is greatly influenced by reaction volume, as well as mixing uniformity of raw materials, mixing time and mixing efficiency during the process.

Currently, there are many studies involving research on improvement of nanoparticle synthesis. In 2009, Tai et al. employs SDR (Spinning Disk Reactor) to continuously prepare silver nanoparticles having a diameter of less than 10 nm with a yield of only 69.4%. In 2010; Hartlieb et al. use hydrogen as a reducing agent to synthesize silver nanoparticles through NCR (Narrow Channel Reactor), which, however, needs a long-term continuous operation or many reactors connected in series. In 2008, Huang et al. synthesize silver nanoparticles having a diameter of 4-50 nm using a T-type blender together with a tubular heater, but the obtained particle diameter distribution is too broad. Also, in 2005, Wagner et al. synthesize silver nanoparticles having a diameter of 5-50 nm using a micro-scaled reactor, but there exists a great limitation on the flow rate of the reaction solution, thus failing to comply with the requirement for mass production.

In view of the above-mentioned problems, what is needed in the art is to develop a substitution for the existing method and device for manufacturing nanoparticles in batch mass production, to meet the industrial requirements such as uniform diameter, mass production, low costs, and so on, to broaden the application field of nanoparticles.

SUMMARY OF THE INVENTION

An object of the present invention is to provide a continuous reactor for manufacturing nanoparticles, wherein nanoparticles having a uniform diameter are prepared by N times of alternating diverging and converging channels connected in series.

Another object of the present invention is to provide a method for manufacturing nanoparticles, so as to mix reagents by multiple times of diverging-converging actions to prepare nanoparticles having a uniform diameter in mass production.

To achieve the objects, the present invention provides a continuous reactor for manufacturing nanoparticles, comprising: a plurality of first inputs for inputting a plurality of reagents; a first mixing part connected to the first inputs to mix the reagents; N number of first reaction units, each comprising a plurality of first diverging channels and a first converging channel to form a channel having the first diverging channels and the first converging channels alternately connected to one another in series for N times of diverging-converging actions such that the reagents are mixed by the N times of diverging-converging actions and reacted to form nanoparticles, wherein N≥1, and the first diverging channels of a $1^{st}$ one of the first reaction units are connected to the first mixing part; and a first output connected to the first converging channel of an $N^{th}$ one of the first reaction units to output the nanoparticles.

The continuous reactor for manufacturing nanoparticles preferably comprises N number of first reaction units, wherein N>1. Because each of the first reaction units comprises a plurality of the first diverging channels and the first converging channels, a diverging-converging channel having the first diverging channels and the first converging channels alternately connected to one another in series for N times of diverging-converging actions is formed.

In addition, the number of the diverging channels included in the reaction unit is not particularly limited, and preferably from 2 to 10, more preferably from 2 to 5. The channel scale and the reagent flow rate herein are not particularly limited, and may be determined depending on the desired nanoparticle size and the particle diameter distribution. For example, nanoparticles used in conductive ink preferably have a particle diameter of 30-50 nm, and diverging channels having a tube diameter of 1-3 mm and converging channels having a tube diameter of 1-3 mm may be used, with a reagent flow rate of 0.05-0.3 L/min.

In addition, the continuous reactor for manufacturing nanoparticles of the present invention may further comprise: a plurality of second inputs for inputting the reagents; a second mixing part connected to the second inputs to mix the reagents; P number of second reaction units, each comprising a plurality of second diverging channels and a second converging channel to form a channel having the second diverging channels and the second converging channels alternately connected to one another in series for P times of diverging-converging actions such that the reagents are mixed by the P times of diverging-converging actions and reacted to form nanoparticles, wherein P≥1, and the second diverging channels of the $1^{st}$ one of the second reaction units are connected to the second mixing part; a second output connected to the second converging channel of the $P^{th}$ one of the second reaction units to output the nanoparticles; and a control part connected to the first inputs and the second inputs to control the input of the reagents.

The second inputs, the second mixing part, the second traction units, and the second output may be the same as the first inputs, the first mixing part, the first traction units, and the first output, respectively. Further, the continuous reactor for manufacturing nanoparticles preferably comprises P numbers of second reaction units, wherein P>1. Because each of the second reaction units comprises a plurality of the second diverging channels and the second converging channel, a diverging-converging channel having the second diverging channels and the second converging channels alternately connected to one another in series for P times of diverging-converging actions is formed. Herein, the diverging and converging channel scales and the reagent flow rate are not particularly limited, and may be determined depending on the desired nanoparticle size and yield.

In addition, the continuous reactor for manufacturing nanoparticles of the present invention may further comprise a reagent supply part connected to the control part. The supply part for the reagents may contain a plurality of reagents separately placed from each other. For example, a cationic precursor solution, a surfactant, and a precipitant are separately placed. Furthermore, the supply part for the reagents may be equipped with a pump connected to the control part to suck the reagents in the supply part. For example, in the continuous reactor for manufacturing nanoparticles of the present invention, the reagents separately placed from each other are input into the first or the second inputs through the suction by the pump and the input control by the control part, primarily mixed together in the first or the second mixing part, input into the first and/or the second reaction units, and then flowed through the N times and/or P times diverging-converging channels to be further mixed by the diverging-converging actions to obtain nanoparticles having a uniform diameter.

In addition to the above continuous reactor, to achieve other object, the present invention also provides a method for manufacturing nanoparticles, comprising: (A) providing a cationic precursor solution, a surfactant, and a precipitant; (B) mixing the cationic precursor solution, the surfactant, and the precipitant; and (C) diverging and then converging the mixture of the cationic precursor solution, the surfactant, and the precipitant with at least one time of a diverging-converging action for reaction to form a plurality of nanoparticles. Herein, the method for manufacturing nanoparticles may be performed using a continuous reactor of the present invention, wherein the continuous reactor for manufacturing nanoparticles comprising: a plurality of first inputs for inputting a plurality of reagents; a first mixing part connected to the first inputs to mix the reagents; N number of first reaction units, each comprising a plurality of first diverging channels and a first converging channel to form a channel having the first diverging channels and the first converging channels alternately connected to one another in series for N times of diverging-converging actions, wherein N≥1, and the first diverging channels of the $1^{st}$ one of the first reaction units are connected to the first mixing part; and a first output connected to the first converging channel of the $N^{th}$ one of the first reaction units to output the nanoparticles.

The continuous reactor for manufacturing nanoparticles used in the above-mentioned method may further comprise: a plurality of second inputs for inputting the cationic precursor solution, the surfactant, and the precipitant; a second mixing part connected to the second inputs to mix the cationic precursor solution, the surfactant, and the precipitant; P number of second reaction units, each comprising a plurality of second diverging channels and a second converging channel to form a channel having the second diverging channels and the second converging channels alternately connected to one another in series for P times of diverging-converging actions such that the cationic precursor solution, the surfactant, and the precipitant are mixed by the P times of diverging-converging actions and reacted to form nanoparticles, wherein P≥1, and the second diverging channels of the $1^{st}$ one of the second reaction units are connected to the second mixing part; a second output connected to the second converging channel of the $P^{th}$ one of the second reaction units to output the nanoparticles; and a control part connected to the first inputs and the second inputs to control the input of the cationic precursor solution, the surfactant, and the precipitant.

In addition, the continuous reactor for manufacturing nanoparticles used in the above-mentioned method may further comprise a reagent supply part connected to the control part.

The continuous reactor used in the method for manufacturing nanoparticles of the present invention is the same as the continuous reactor of the present invention, and will not be described in further details. In addition, in the continuous reactor of the present invention, since the reagents may be input into the first and/or the second inputs under the control of the control part, when the first inputs are blocked, the reagent may be immediately switched into the second inputs by the control part, thereby continuously synthesizing nanoparticles by the second reaction units.

In the above method, the nanoparticles are not particularly limited, and may be nonmetal or metal nanoparticles, and preferably metal nanoparticles. In the method for manufacturing nanoparticles of the present invention, the cationic precursor solution is not particularly limited, and may be metal or nonmetal precursor solution. For example, in the case of metal nanoparticle synthesis, the cationic precursor solution may be the metal cationic precursor solution, which may be at least one selected from a group consisting of: a silver precursor solution, a copper precursor solution, a gold precursor solution, a nickel precursor solution, and combinations thereof, formed from a metal nitrate compound, a metal sulfate compound, and a metal acetate compound, etc. Furthermore, the surfactant is not particularly limited, and preferably at least one selected from a group consisting of: polyvinyl pyrrolidone (PVP), polyvinyl alcohol, polyacrylic acid, an alkyl sulfate, an alkyl sulfonate, an alkanoate, alkyl ammonium bromide, and a citrate. Also, the precipitant is not particularly limited, and preferably selected from a group consisting of: sodium borohydride, hydrazine, formaldehyde, ascorbic acid, sodium hydrogen phosphite, an alcohol amine, glucose, a hydroxide, a sulfide, a halide, and combinations thereof.

The channel size of diverging and converging channels in the continuous reactor are not particularly limited. For example, it may be in centimeter-scale to enable a higher flow rate tolerance for the continuous reactor, thereby reducing the risk of solution leakage due to overly high pressure to the inner wall of the reactor, as well as preventing the channels from blockage. As such, the concentration of the metal precursor used may be greatly increased to 0.1M, for example, a yield as high as 98% may be achieved within the same production time, and the synthesized nanoparticles may have diameters of high distribution uniformity.

In addition, the continuous reactor may perform an oil phase or a water phase process, and the obtained nanoparticles may have various applications, such as printing conductive inks (low viscosity type), conductive silver pastes (middle-high viscosity type), or conductive wires on flexible soft boards (such as PET, PI).

DETAILED DESCRIPTION OF THE PREFERRED EMBODIMENT

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention, and those skilled in the art will appreciate that various modifications, additions and substitutions are possible.

Example 1

Continuous Reactor for Manufacturing Nanoparticles

Figure 1:
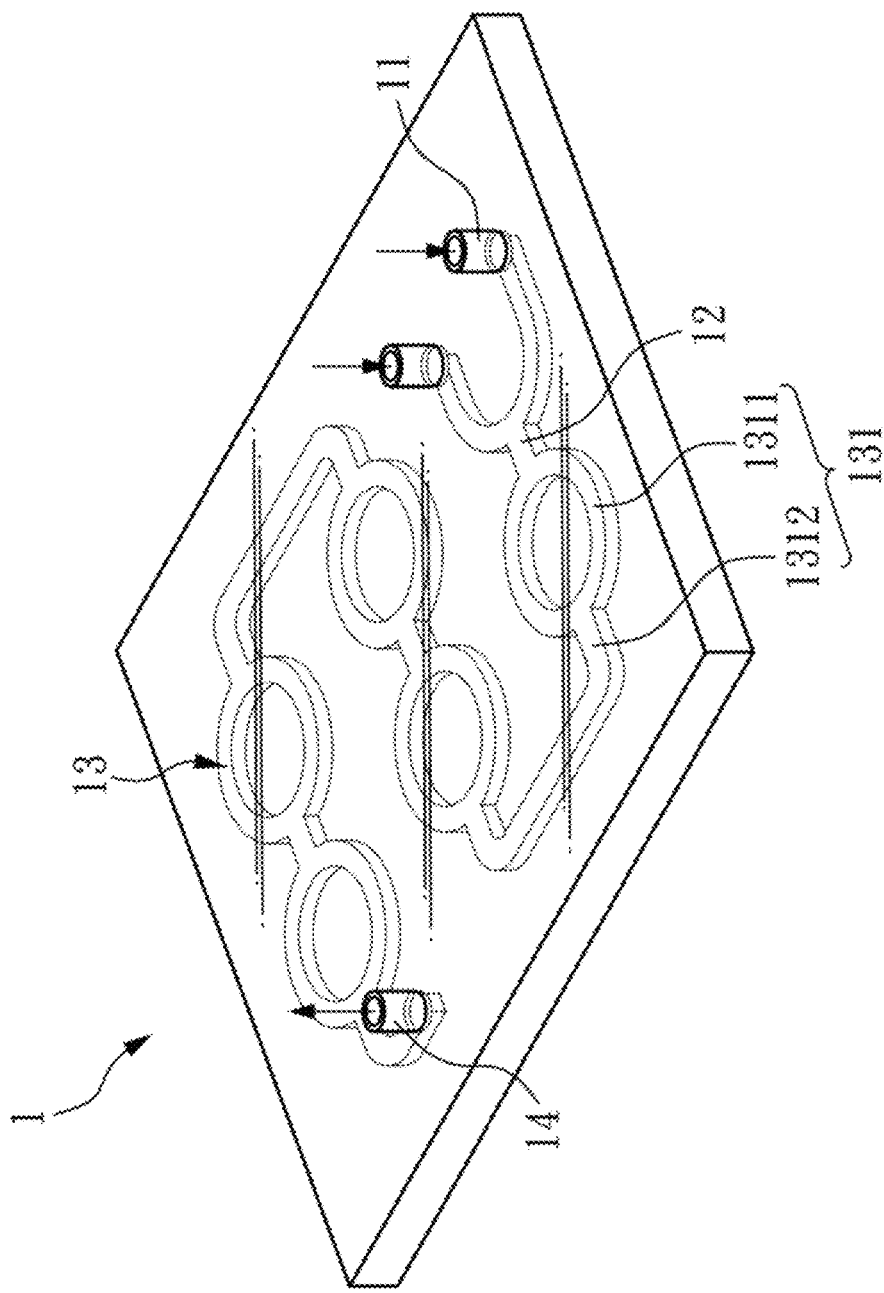
FIG. 1 shows the first reactor of the continuous reactor for manufacturing nanoparticles according to Example 1 of the present invention.

FIG. 1 shows a first reactor of the continuous reactor for manufacturing nanoparticles of Example 1, which comprises: two first inputs 11; a first mixing part 12 connected to the first inputs 11; a first reaction part 13 comprising five first reaction units 131, each comprising two first diverging channels 1311 and one first converging channel 1312 alternately connected to one another thereby connecting the five first reaction units 131 in series to form a five-times diverging-converging channels. Besides, the first diverging channels 1311 of the first one of the first reaction units 131 are connected to the first mixing part 12. Further, the continuous reactor for manufacturing nanoparticles of Example 1 also comprises a first output 14 connected to the first converging channel 1312 of the fifth one of the first reaction units 131 to output the produced nanoparticles.

Figure 2:
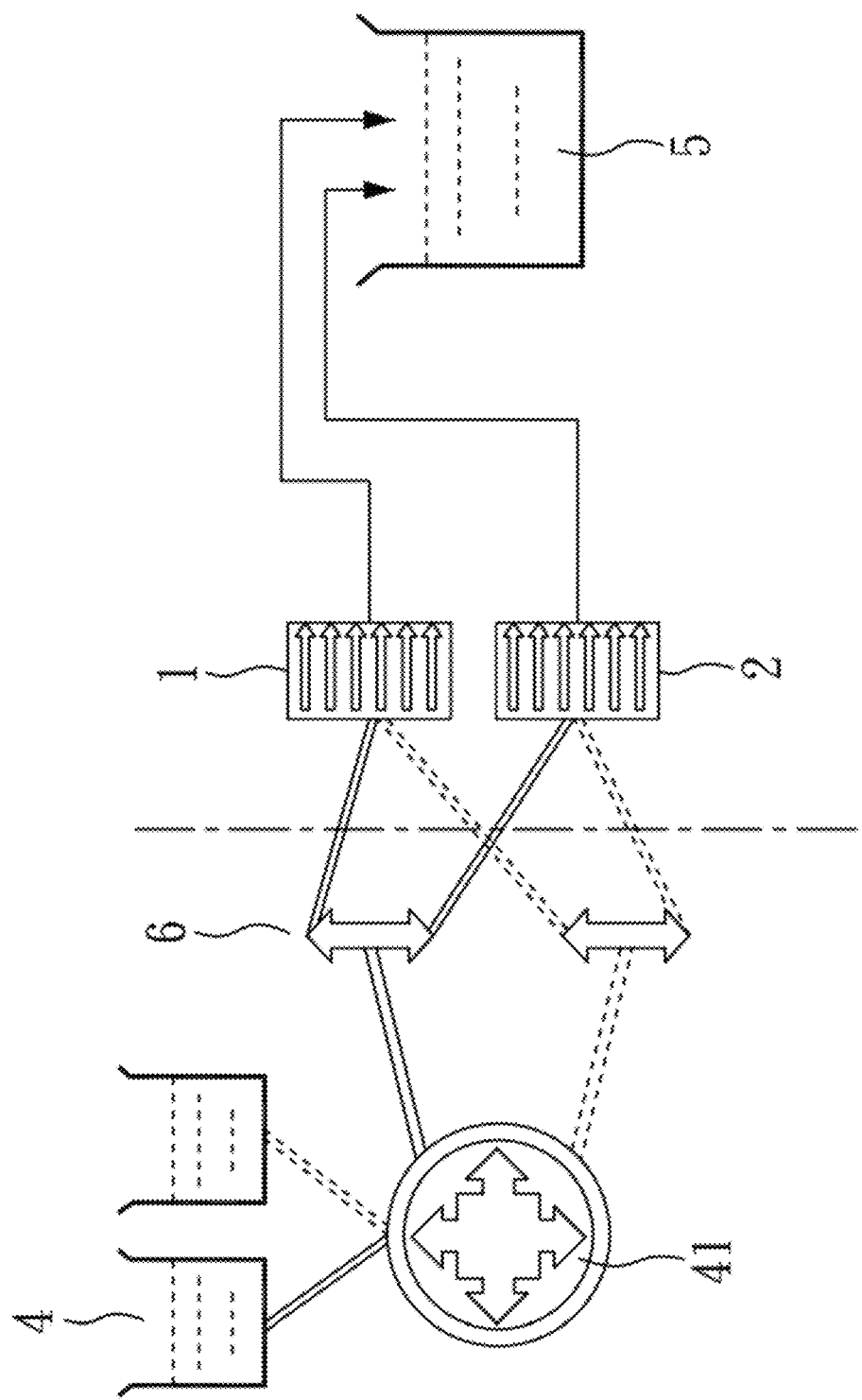
FIG. 2 shows the continuous reactor for manufacturing nanoparticles according to Example 1 of the present invention.

As illustrated in FIG. 2, in addition to the above first reactor 1, the continuous reactor for manufacturing nanoparticles of this Example 1 may further comprise: a second reactor 2, a control part 6 connected to the first inputs 11 of the first reactor 1 and a second input (not shown) of the second reactor 2, a reagent supply part 4, and a product collection tank 5, wherein the reagent supply part 4 comprises a pump 41 connected to the control part 6, through which each of the separated reagents sucked by the pump 41 are introduced to the first reactor 1 and/or the second reactor 2. Here, the diverging channels each has a tube diameter of 3 mm, and the converging channel has a tube diameter of 3 mm, wherein the overall length of the channels is 15 cm. In addition, users may add quantity of the reactors depending on various requirements, and the reactors may be connected in series or in parallel without particular limitations.

Example 2

Preparation of Water-Soluble Silver Nanoparticles

Example 2-1

Preparation of Water-Soluble Silver Nanoparticles by the Method of the Present Invention Referring to FIGS. 1 and 2 collectively, Example 2 illustrates the preparation of water-soluble silver nanoparticles using the reactors of Example 1.

16.9 g of silver nitrate and the same amount of polyvinyl pyrrolidone (PVP) molecule were dissolved in 0.5 L of deionized water to form a mixed solution of the silver precursor solution and the surfactant, and then 3.7 g of sodium borohydride was dissolved in 0.5 L of deionized water to form a precipitant solution. The mixed solution and the precipitant solution were placed in the reagent supply part 4 respectively, passed through the first inputs 11 by the pump 41, and primarily mixed in the first mixing part 12. Then, the obtained mixture was introduced into the first diverging channels 1311 of the first reaction unit 131 with a flow rate of 0.3 L/min, and converged in the first converging channel, thus completing the first time of diverging-converging action. The above mixture was subjected to five times of the diverging-converging actions in total, and the synthesized nanoparticles were collected by the product collection tank 5.

Figure 3:
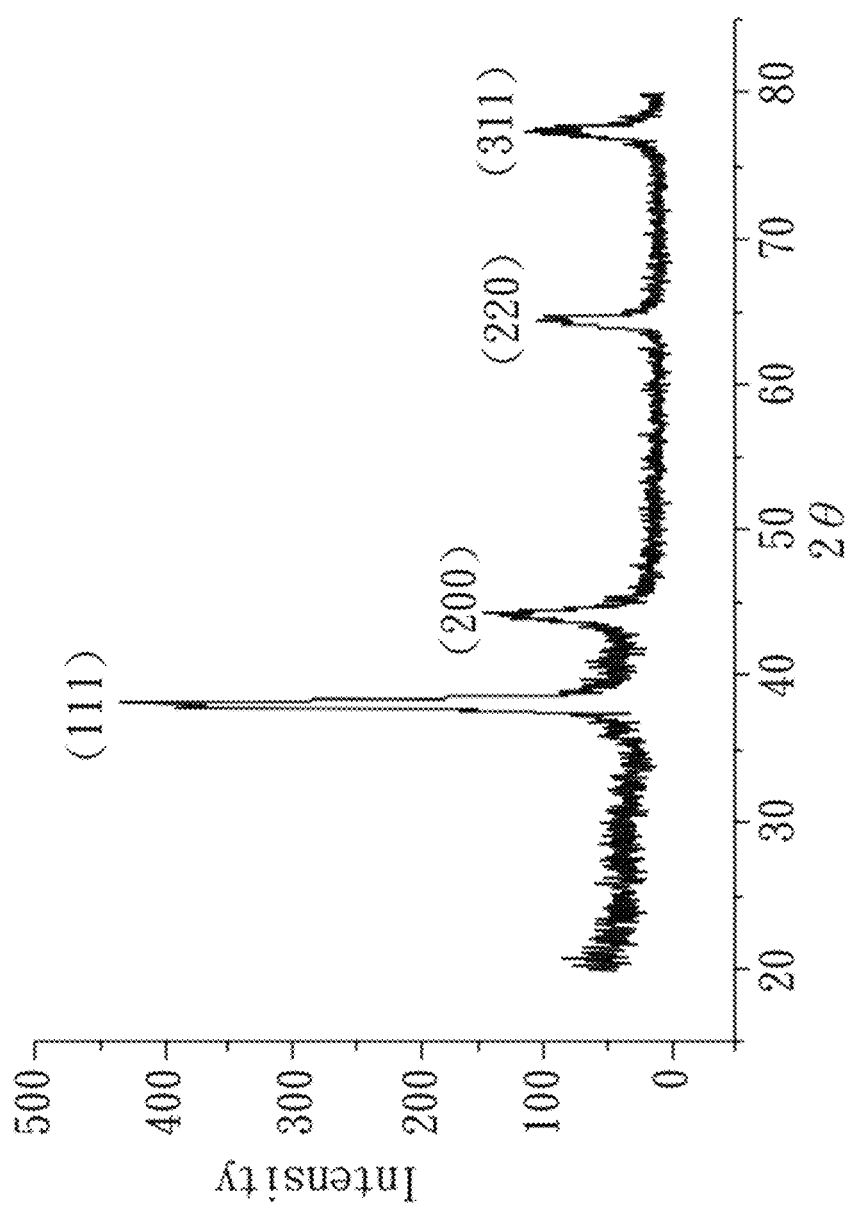
FIG. 3 shows the diagram of XRD analysis according to Example 2-1 of the present invention.
Figure 4:
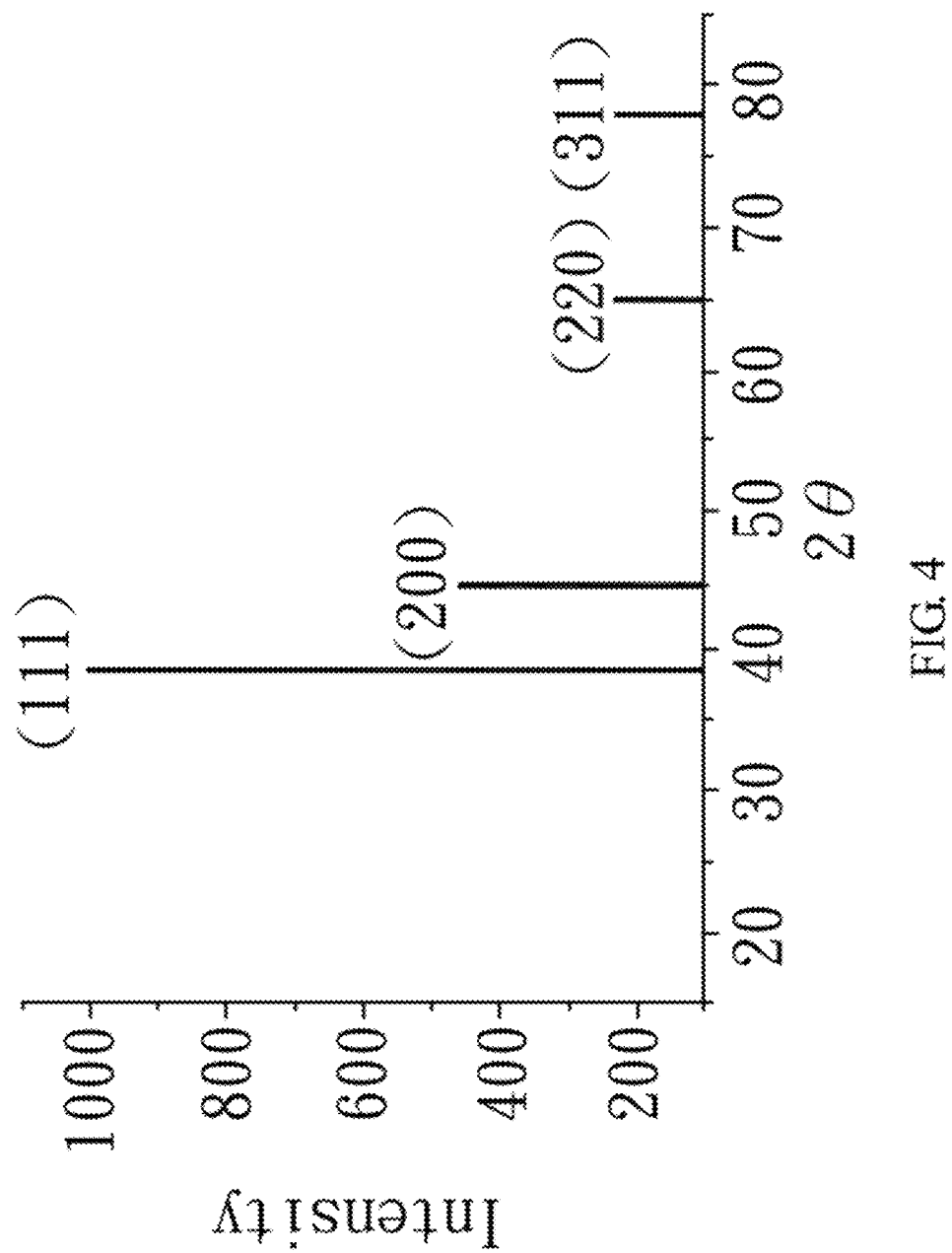
FIG. 4 shows the standard spectral graph of the lump silver according to Example 2-1 of the present invention.

In this Example, 10.8 g of the synthesized silver nanoparticles were collected by the product collection tank 5. The synthesized silver nanoparticles had an average diameter of 26.18 nm with a standard deviation of 3.33 nm, and the throughput was 175 g/hr. FIG. 3 shows the diagram of XRD analysis according to Example 2-1 of the present invention. FIG. 4 shows the standard spectral graph of the lump silver according to Example 2-1 of the present invention. The results of FIGS. 3 and 4 confirmed that the synthesized product was silver. The calculation of FIG. 4 was based on POWD-12++ and performed by ICSD (1997), in reference to Owen. E A., Williams, G. I., J. Sci. Instrum., 31, 49 (1954).

Comparative Example 2-1

Preparation of Silver Nanoparticles by Conventional Batch Method

The mixed solution of the silver precursor solution and the surfactant, and the precipitant solution used in Comparative Example 2-1 were substantially the same as Example 2-1, except that the mixture thereof was blended vigorously to prepare the silver nanoparticles having an average diameter of 28.63 nm.

Figure 5A:
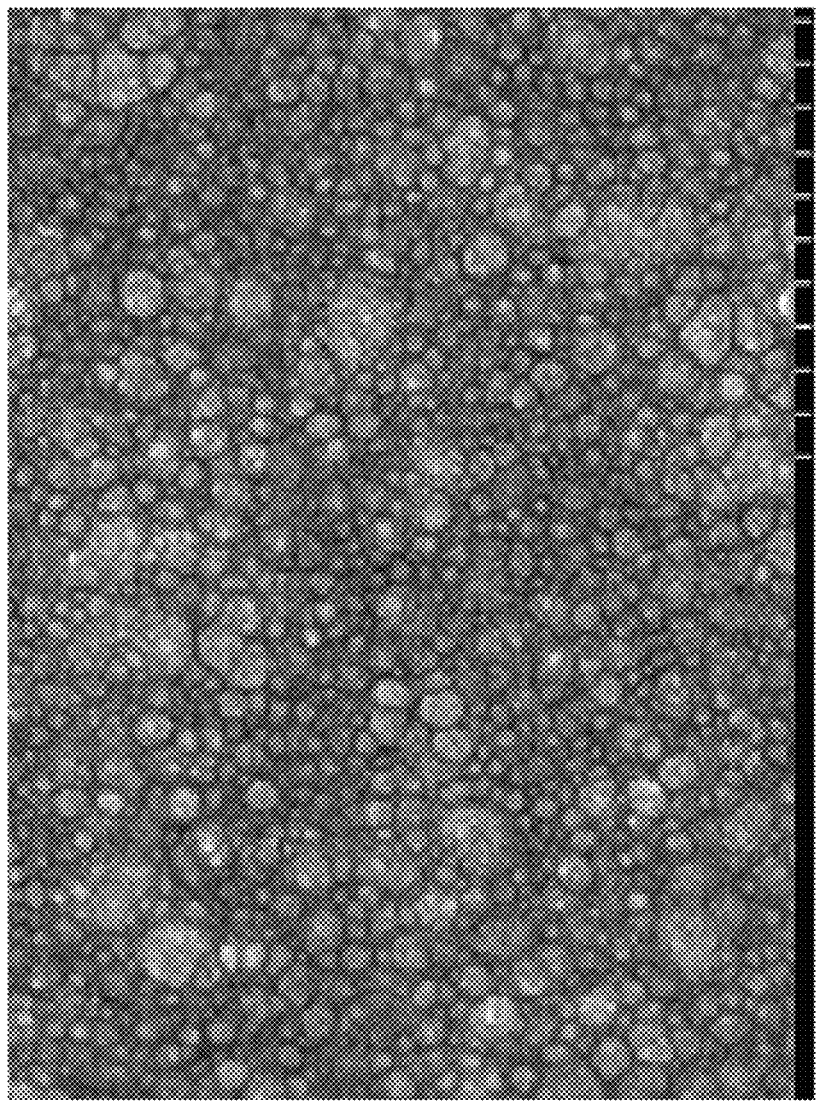
FIG. 5A shows the SEM image according to Comparative Example 2-1.
Figure 5B:
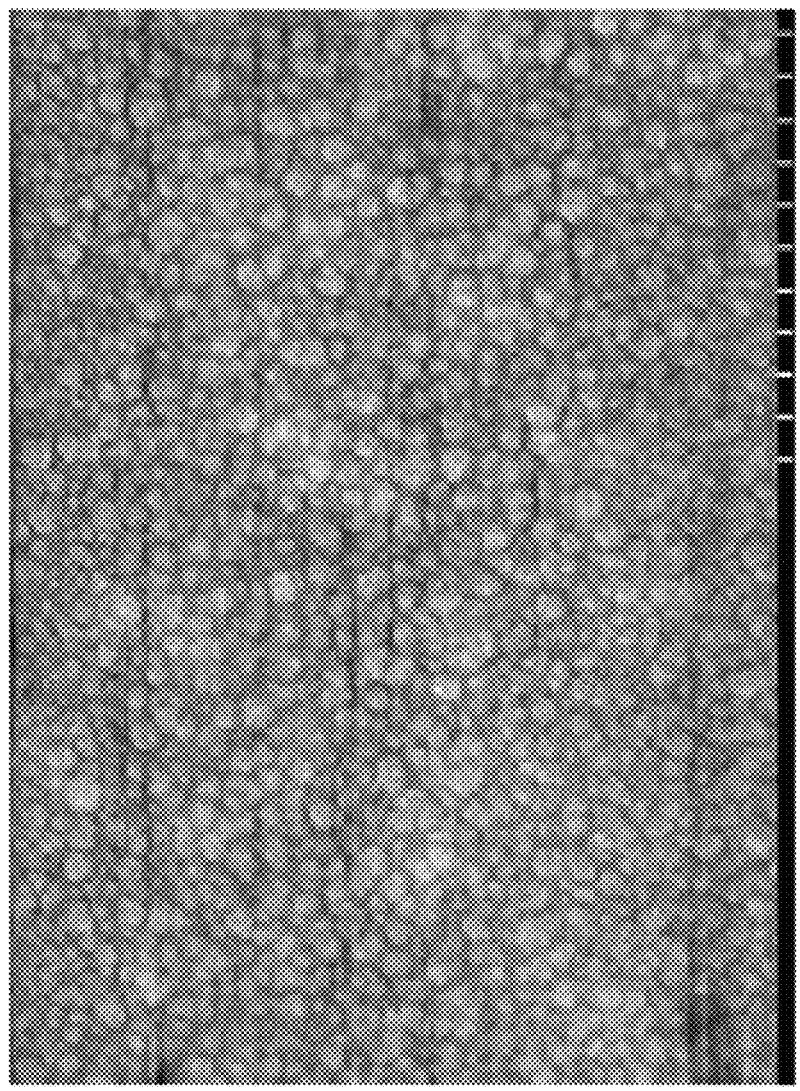
FIG. 5B shows the SEM image according to Example 2-1.
Figure 6:
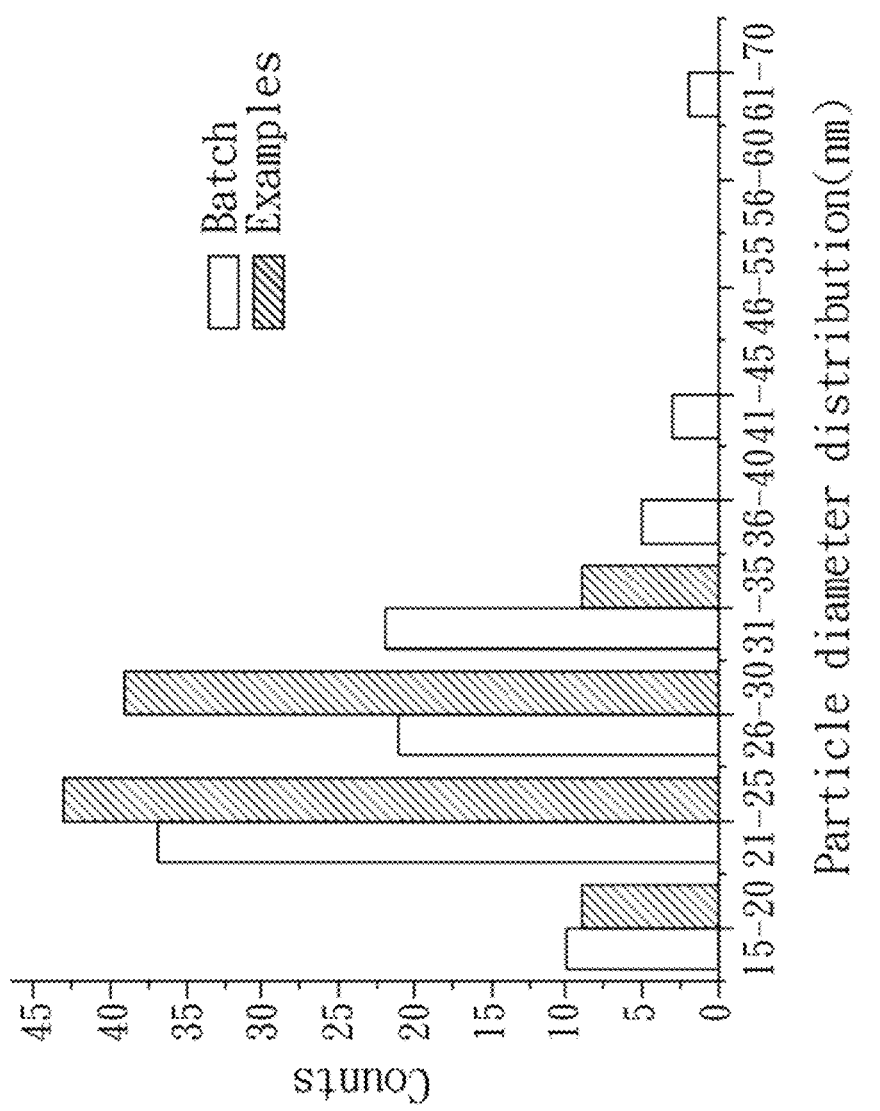
FIG. 6 shows the calculated particle diameter distribution diagram of the silver nanoparticles of Example 2-1 and Comparative Example 2-1.

FIG. 5A shows the SEM image according to Comparative Example 2-1, and FIG. 5B shows the SEM image according to Example 2-1, wherein the silver nanoparticles of Comparative Example 2-1 had an average diameter of 28.36 nm with a standard deviation of 8 nm, while the silver nanoparticles of Example 2-1 had an average diameter of 26.18 nm with a standard deviation of 3.33 nm. According to FIGS. 5A and 5B, although the nanoparticles prepared by the conventional batch method had a similar average diameter to Example 2-1, their standard deviation of diameter was as high as 8 nm, while the synthesized nanoparticles of Example 2-1 had an average diameter of 26.18 nm with a standard deviation of 3.33 nm. In addition, FIG. 6 shows the calculated particle diameter distribution diagram of the nanoparticles of Example 2-1 and Comparative Example 2-1, wherein the synthesized nanoparticles of Example 2-1 had a more concentrated diameter distribution, while the batch method of Comparative Example 2-1 failed to obtain a diameter distribution as concentrated as the present invention.

The results of Example 2-1 and Comparative Example 2-1 confirmed that the method of Example 2-1 (i.e. the method for manufacturing nanoparticles of the present invention) and the continuous reactor for manufacturing nanoparticles of this Example 1 (i.e. the continuous reactor for manufacturing nanoparticles of the present invention) can continuously prepare the nanoparticles having a high concentrated diameter distribution with a high yield.

Example 3

Preparation of E Water-Soluble Silver Copper Nanoparticles

Referring to FIGS. 1 and 2, the method of this Example was substantially the same as Example 2-1, except that 16.9 g of silver nitrate, the same amount of polyvinyl pyrrolidone (PVP), and 17.6 g of copper nitrate were dissolved in 0.5 L of deionized water to form a mixed solution of the copper precursor solution, silver precursor solution, and the surfactant, and then 4.2 g of sodium borohydride was dissolved in 0.5 L of deionized water to form a precipitant solution.

Figure 7:
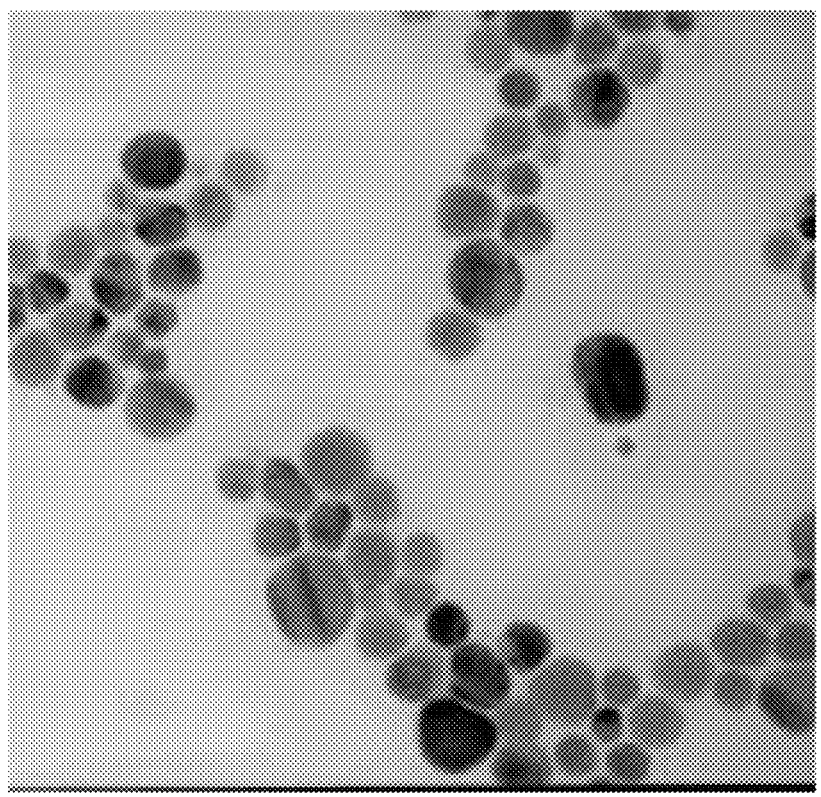
FIG. 7 shows the SEM image according to Example 3 of the present invention.
Figure 8:
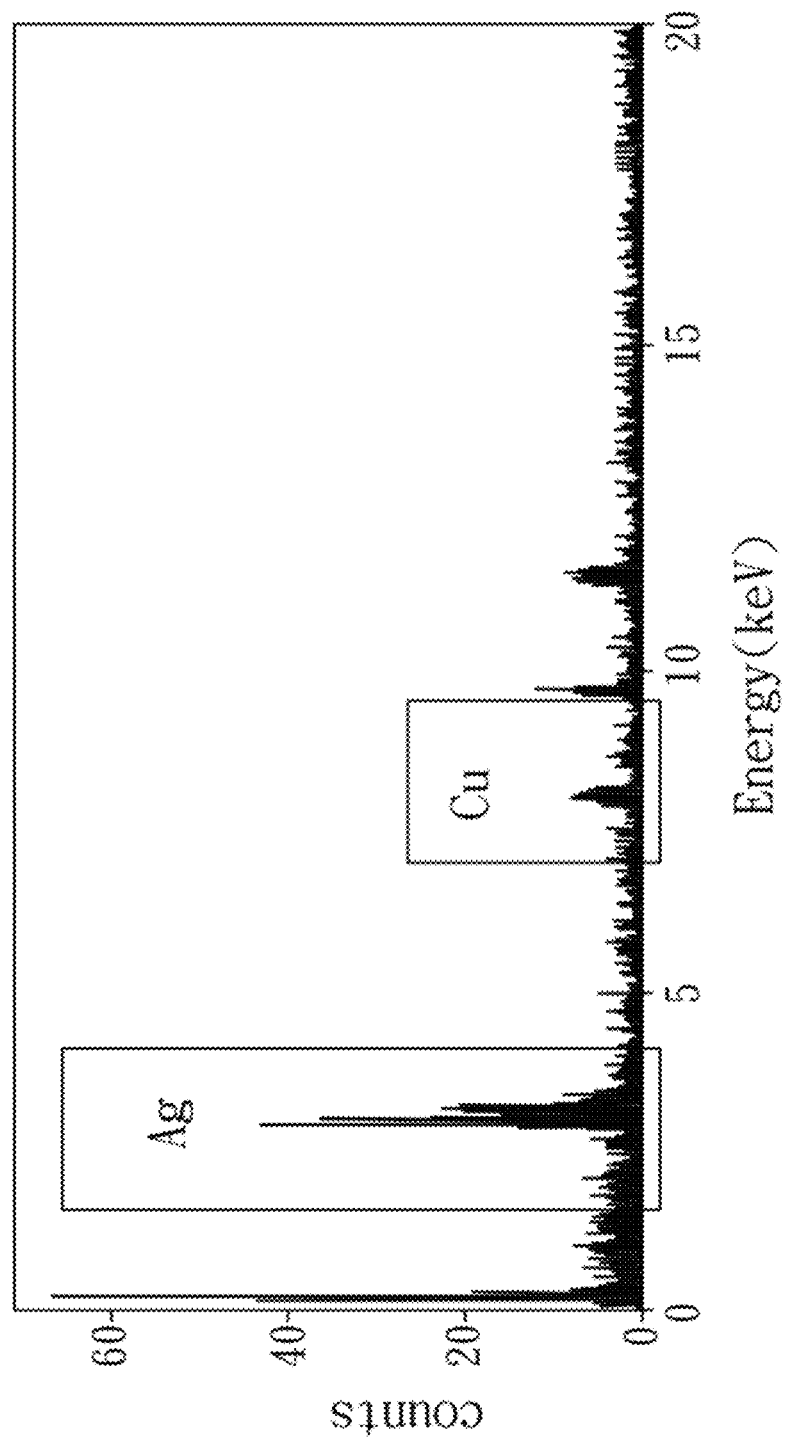
FIG. 8 shows the diagram of EDX element analysis according to Example 3 of the present invention.

In this Example, 15.4 g of the synthesized silver copper nanoparticles could be collected with a throughput of 250 g/hr. The synthesized silver copper nanoparticles were observed with a SEM, and the result was shown in FIG. 7. The average diameter of the synthesized silver copper nanoparticles of this Example was calculated as 18.5 nm with a standard deviation of 5.5 nm, confirming that this Example may obtain silver copper nanoparticles having a uniform diameter distribution. Furthermore, the products of this Example were analyzed by EDX element analysis, and the result was shown in FIG. 8, confirming that the obtained nanoparticles in this Example consisted of silver and copper.

Example 4

Preparation of Water-Soluble Silver Nanoparticles

Figure 9:
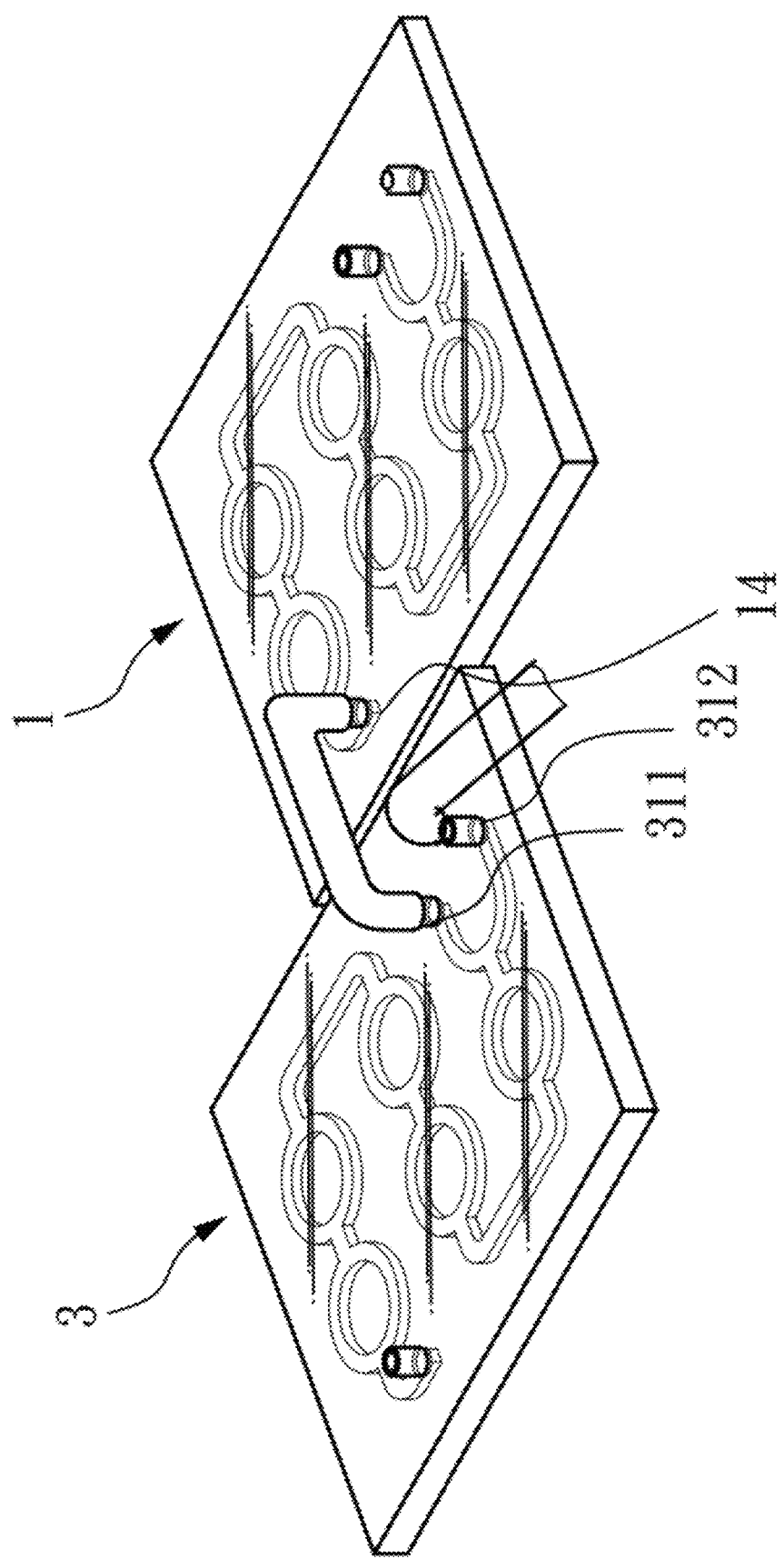
FIG. 9 shows the continuous reactor according to Example 4 of the present invention.

FIG. 1 and FIG. 9 show the continuous reactor for manufacturing nanoparticles of Example 4 according to the present invention, the reactor of this Example was substantially the same as the continuous reactor of Example 1, except that the continuous reactor of this Example employed two reactors of Example 1, which were connected in series, and one of them was referred to as a first reactor 1, while the other was referred to as a third reactor 3. The two reactors were connected in series such that a third input 311 of the third reactor 3 was connected to the first output 14 of the first reactor 1.

16.9 g of silver nitrate and 24 g of urea were dissolved in 0.25 L of deionized water to form a silver precursor solution; 1.69 g of polyvinyl pyrrolidone (PVP) powder, 0.83 g of tetrabutylammonium bromide (TBAB), and 3.95 g of sodium hydroxide were dissolved in 0.25 L of deionized water to form a mixed solution of the surfactant and the first precipitant (an alkali agent); then 3.7 g of sodium borohydride was dissolved in 0.5 L of deionized water to form the second precipitant solution (a reducing agent).

Next, the mixed solution of the silver precursor solution, the surfactant, and the first precipitant were introduced into the first reactor 1 with a flow rate of 0.3 L/min through the pump 41 respectively, subjected to five times of diverging-converging action, and then introduced into a third input 311 of the third reactor 3. Meanwhile, the second precipitant solution was introduced into another third input 312 of the third reactor 3, and subjected to five times of diverging-converging actions. Finally, the synthesized nanoparticles were collected by the product collection tank to complete the preparation of nanoparticles in this Example.

Figure 10:
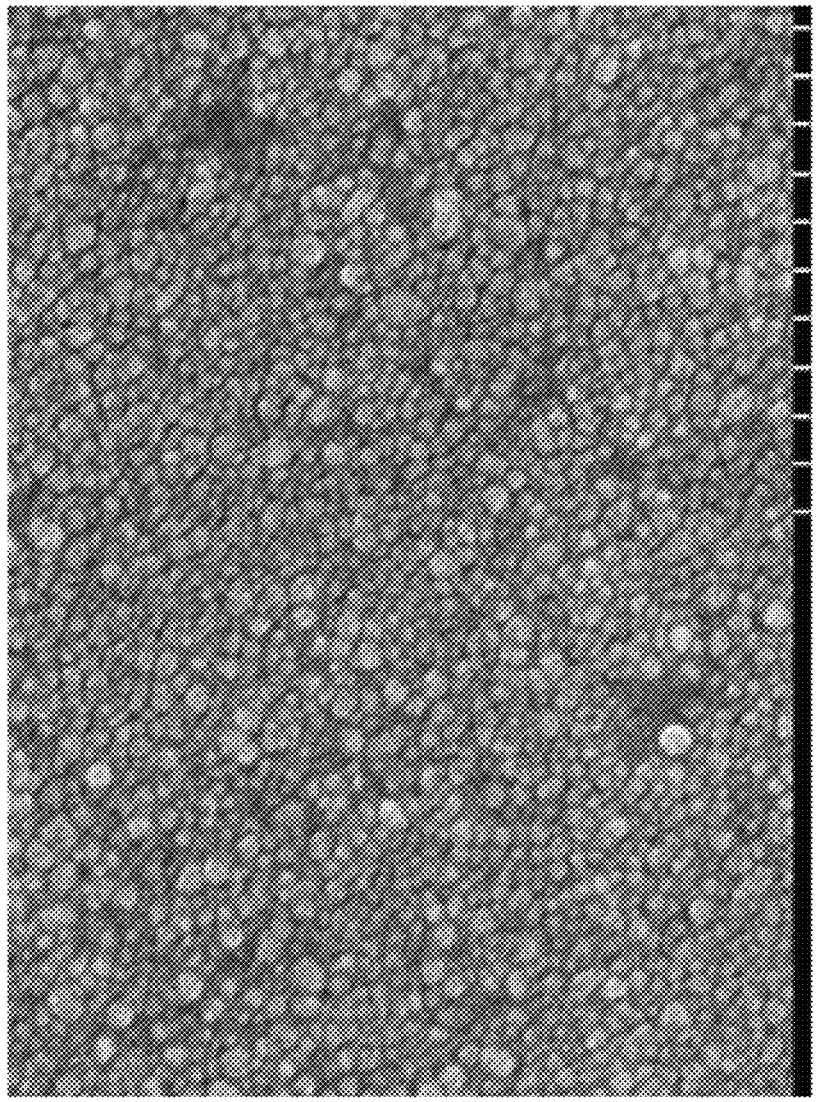
FIG. 10 shows the SEM image according to Example 4 of the present invention.
Figure 11:
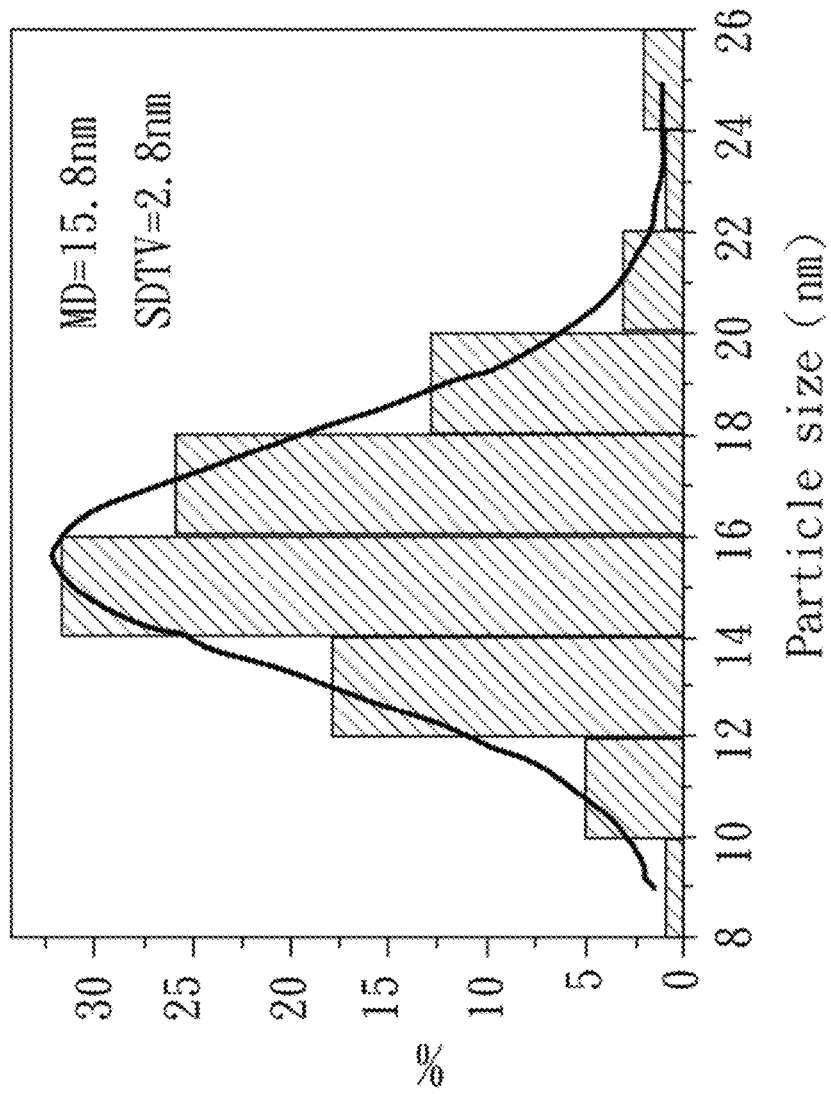
FIG. 11 shows the diameter analysis diagram according to Example 4 of the present invention.

In this Example, 10.8 g of the synthesized silver nanoparticles could be collected with a throughput of 175 g/hr. FIG. 10 shows the SEM image of Example 4, and FIG. 11 shows the diameter analysis diagram of Example 4. Referring to FIGS. 10 and 11, the synthesized silver nanoparticles of this Example had an average diameter of 15.8 nm with a standard deviation of 2.8 nm, showing that this Example may obtain silver nanoparticles having a uniform diameter distribution. Further, the silver nanoparticles may be dispersed in an aqueous solution such as water and alcohol after washing and purification.

Example 5

Preparation of Oil-Soluble Silver Nanoparticles

Referring to FIG. 1 and FIG. 9, the reactor of this Example was substantially the same as the continuous reactor of Example 4, wherein the first reactor 1 and the third reactor 3 were connected in series.

16.9 g of silver nitrate and 24 g of urea were dissolved in 0.25 L of deionized water to form a silver precursor solution; 1.69 g of polyvinyl pyrrolidone (PVP) powder, 0.83 g of tetrabutylammonium bromide (TBAB), and 3.95 g of sodium hydroxide were dissolved in 0.25 L of deionized water to form a mixed solution of the surfactant and the first precipitant (an alkali agent); then 3.7 g of sodium borohydride was dissolved in 0.5 L of deionized water to form the second precipitant solution (a reducing agent).

Next, the mixed solution of the silver precursor solution, the surfactant, and the first precipitant were introduced into the first reactor 1 with a flow rate of 0.3 L/min through the pump 41 respectively, and subjected to five times of diverging-converging actions, and then introduced into a third input 311 of the third reactor 3. Meanwhile, the second precipitant solution was introduced into another third input 312 of the third reactor 3, and subjected to five times of diverging-converging actions. Finally, the synthesized nanoparticles were collected by the product collection tank to accomplish the preparation of nanoparticles in this Example.

By this Example, about 10.8 g of the synthesized silver copper nanoparticles was collected with a throughput of 175 g/hr. The average diameter of the synthesized silver nanoparticles of this Example was 11.9 nm with a standard deviation of 2.1 nm. Further, the silver nanoparticles may be dispersed in a non-polar solvent such as hexane, toluene and chloroform, and so on after washing and purification. In this Example, the washed silver nanoparticles dispersed in hexane, and in the hexane solution which had been subjected to oil/water separation, it can be obviously observed that the silver nanoparticles were dispersed in hexane, instead of water.

Example 6

Application of the Silver Nanoparticles of Example 2-1

Figure 12:
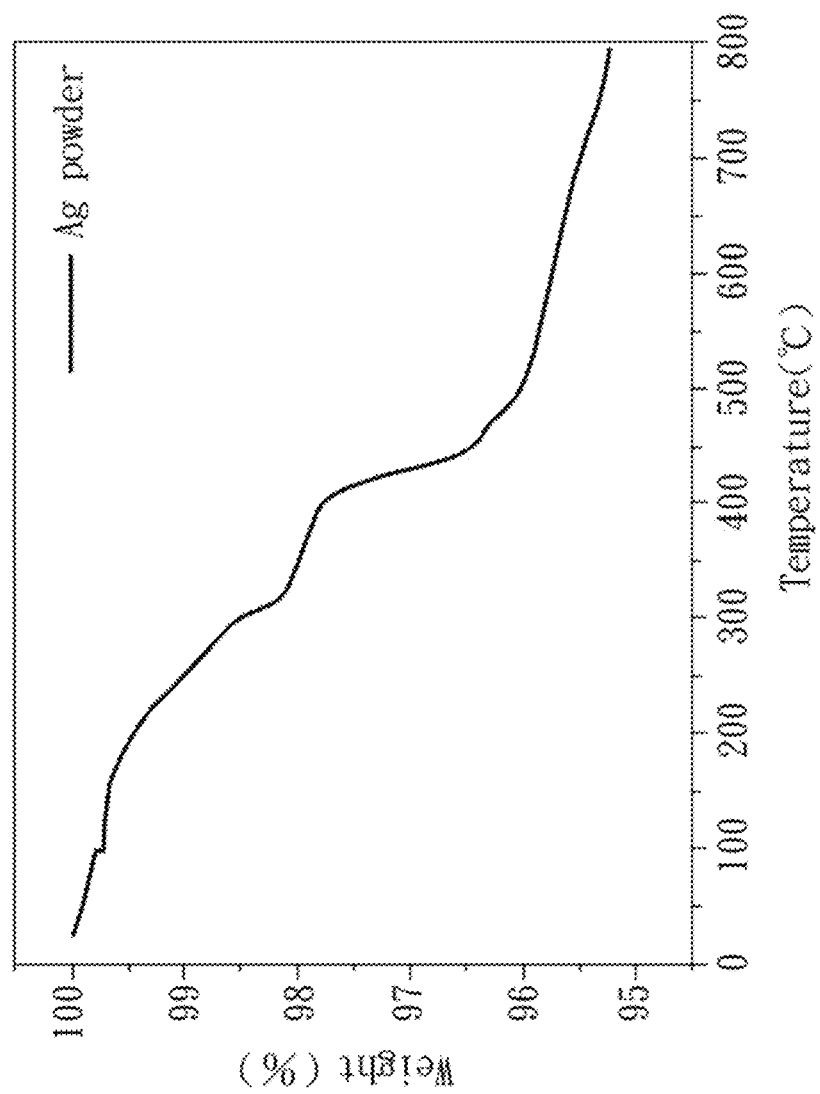
FIG. 12 shows the thermogravimetric analysis diagram according to Example 6 of the present invention.

The silver nanoparticles of Example 2-1 were washed by acetone and deionized water to remove excess surfactants such as PVP and ionic materials, and then the silver nanoparticles were purified to retain 5 wt % of the PVP surfactant on the surface thereof, as shown in FIG. 12. After that, the silver nanoparticles were dispersed in an alcoholic solvent to form a 25 wt % of conductive ink. The specific solvent was selected according to various subsequent applications to adjust its content and compositional proportion, wherein the selection of solvent may take into consideration mainly the liquid viscosity, surface tension, drying shrinkage, and so on. In this Example, the solvent was an alcohol-based mixture comprising ethanol, butanol, ethylene glycol, and glycerol, and the silver conductive ink had 25 wt % of metal content, 31-33 dyne/cm of surface tension, and 11-15 cp of viscosity.

Figure 13:
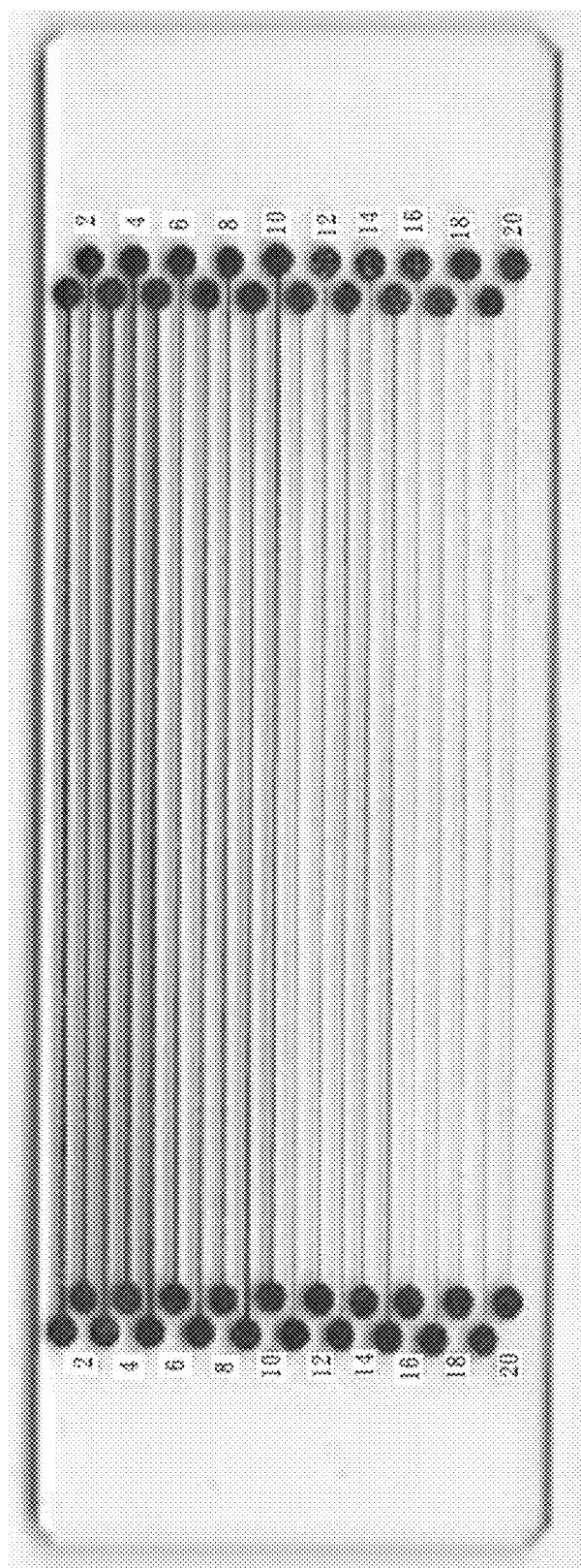
FIG. 13 shows the flexible soft board according to Example 6 of the present invention.

The silver conductive paste may be output by ink-jet on a rigid board such as glass or a PET flexible soft board, to accomplish a conductive line patterning, as shown in FIG. 13.

While the invention has been described in detail and with reference to specific embodiments thereof, it is to be understood that the foregoing description is exemplary and explanatory in nature and is intended to illustrate the invention and its preferred embodiments. Through routine experimentation, one skilled in the art will readily recognize that various changes and modifications can be made therein without departing from the spirit and scope of the invention. Thus, the invention is intended to be defined not by the above description, but by the following claims and their equivalents.

What is claimed is:

1. A continuous reactor for manufacturing nanoparticles, comprising:
   a plurality of first inputs for inputting a plurality of reagents;
   a first mixing part connected to the first inputs to mix the reagents;
   N number of first reaction units, each comprising a plurality of first diverging channels and first converging channels to form a diverging-converging channel having the first diverging channels and the first converging channels alternately connected to one another in series for N times of diverging-converging conduits such that the reagents are mixed by the N times of diverging-converging conduits and reacted to form nanoparticles, wherein N≥2, and the first diverging channels of a $1^{st}$ one of the first reaction units are connected to the first mixing part; and
   a first output connected to the first converging channels of an $N^{th}$ one of the first reaction units to output the nanoparticles.

2. The continuous reactor for manufacturing nanoparticles of claim 1, further comprising:
   a plurality of second inputs for inputting the reagents;
   a second mixing part connected to the second inputs to mix the reagents;
   P number of second reaction units, each comprising a plurality of second diverging channels and second converging channels to form a channel having the second diverging channels and the second converging channels alternately connected to one another in series for P times of diverging-converging conduits, such that the reagents are mixed by the P times of diverging-converging conduits and reacted to form nanoparticles, wherein P≥1, and the second diverging channels of the $1^{st}$ one of the second reaction units are connected to the second mixing part;
   a second output connected to the second converging channels of the $P^{th}$ one of the second reaction units to output the nanoparticles; and
   a control part connected to the first inputs and the second inputs to control the input of the reagents.

3. The continuous reactor for manufacturing nanoparticles of claim 2, further comprising: a reagent supply part connected to the control part.

4. A method for manufacturing nanoparticles, comprising:
   (A) providing a cationic precursor solution, a surfactant, and a precipitant;
   (B) mixing the cationic precursor solution, the surfactant, and the precipitant; and
   (C) diverging and then converging the mixture of the cationic precursor solution, the surfactant, and the precipitant with at least two times of diverging-converging conduits for reaction to form a plurality of nanoparticles,
   wherein the nanoparticles are obtained by inputting the cationic precursor solution, the surfactant, and the precipitant to a continuous reactor for manufacturing nanoparticles comprising:
      a plurality of first inputs for inputting a plurality of reagents;
      a first mixing part connected to the first inputs to mix the reagents;
      N number of first reaction units, each comprising a plurality of first diverging channels and first converging channels to form a channel having the first diverging channels and the first converging channels alternately connected to one another in series for N times of diverging-converging conduits such that the cationic precursor solution, the surfactant, and the precipitant are mixed by the N times of diverging-converging conduits and reacted to form nanoparticles, wherein N≥2, and the first diverging channels of a $1^{st}$ one of the first reaction units are connected to the first mixing part; and
      a first output connected to the first converging channels of an $N^{th}$ one of the first reaction units to output the nanoparticles.

5. The method for manufacturing nanoparticles of claim 4, wherein the continuous reactor for manufacturing nanoparticles further comprises:
   a plurality of second inputs for inputting the reagents;
   a second mixing part connected to the second inputs to mix the reagents;
   P number of second reaction units, each comprising a plurality of second diverging channels and a second converging channel to form a channel having the second diverging channels and the second converging channels alternately connected to one another in series for P times of diverging-converging actions such that the cationic precursor solution, the surfactant, and the precipitant are mixed by the P times of diverging-converging actions and reacted to form nanoparticles, wherein P≥1, and the second diverging channels of the $1^{st}$ one of the second reaction units are connected to the second mixing part;
   a second output connected to the second converging channel of the $P^{th}$ one of the second reaction units to output the nanoparticles; and
   a control part connected to the first inputs and the second inputs to control the input of the reagents.

6. The method for manufacturing nanoparticles of claim 5, wherein the continuous reactor for manufacturing nanoparticles further comprises a reagent supply part connected to the control part.

7. The method for manufacturing nanoparticles of claim 4, wherein the cationic precursor solution is at least one selected from a group consisting of a silver precursor solution, a copper precursor solution, a gold precursor solution, a nickel precursor solution, and combinations thereof.

8. The method for manufacturing nanoparticles of claim 4, wherein the precipitant is at least one selected from a group consisting of sodium borohydride, hydrazine, formaldehyde, ascorbic acid, sodium hydrogen phosphite, an alcohol amine, glucose, a hydroxide, a sulfide, a halide, and combinations thereof.

9. The method for manufacturing nanoparticles of claim 4, wherein the surfactant is selected from at least a group consisting of: polyvinyl pyrrolidone (PVP), polyvinyl alcohol, polyacrylic acid, an alkyl sulfate, an alkyl sulfonate, an alkanoate, alkyl ammonium bromide, and a citrate.

* * * * *